United States Patent [19]

Inoue

[11] 4,310,741
[45] Jan. 12, 1982

[54] STORAGE-CAPACITOR-TYPE EDM POWER SUPPLY

[75] Inventor: Kiyoshi Inoue, Tokyo, Japan

[73] Assignee: Inoue-Japax Research Incorporated, Yokohama, Japan

[21] Appl. No.: 119,565

[22] Filed: Feb. 7, 1980

[30] Foreign Application Priority Data

Feb. 9, 1979 [JP] Japan .................................. 54-14094

[51] Int. Cl.³ .............................................. B23P 1/02
[52] U.S. Cl. ................................ 219/69 P; 219/69 C
[58] Field of Search ............................ 219/69 P, 69 C

[56] References Cited

U.S. PATENT DOCUMENTS

| 3,956,609 | 5/1976 | Marendaz | 219/69 P |
| 3,974,357 | 8/1976 | Saito et al. | 219/69 C |
| 4,072,842 | 2/1978 | Ullmann et al. | 219/69 P |

FOREIGN PATENT DOCUMENTS

| 4612515 | 2/1967 | Japan | 219/69 P |
| 1167853 | 10/1969 | United Kingdom | 219/69 P |
| 1483679 | 8/1977 | United Kingdom | |

*Primary Examiner*—C. C. Shaw
*Attorney, Agent, or Firm*—Karl F. Ross

[57] ABSTRACT

A storage-capacitor-type EDM power-supply system wherein the storage capacitor is charged from a DC source to store a predetermined amount of charge thereon under the control of a switch connected between the DC source and the capacitor. The discharge circuit connecting the capacitor with an EDM gap to allow the stored charge to be discharged through the latter also includes a switch which is controlledly rendered conductive by a signal pulse generator which provides a controlled switching signal preprogrammed in a microprocessor such that the capacitor discharge machining current has a predetermined waveform corresponding to the preprogrammed signal. Preferably, the machining current in each capacitor-discharge cycle is in the form of a composite pulse consisting of a series of periodically interrupted pulses of a minimum on-time and off-time.

5 Claims, 7 Drawing Figures

STORAGE-CAPACITOR-TYPE EDM POWER SUPPLY

THE FIELD OF THE INVENTION

The present invention relates to a storage-type power-supply system for electrical discharge machining (EDM) and, more particularly, to an improved capacitor-type system for providing a series of controlledly pulsed electrical discharges across a machining gap between a tool electrode and a workpiece to electroerosively machine the workpiece.

BACKGROUND OF THE INVENTION

A storage-type power supply has long been known and practiced for EDM wherein a storage capacitor is charged by a direct-current (DC) source, the charge stored on the capacitor being discharged through the machining gap formed between the tool electrode and the workpiece to repetitively produce a pulsed electrical discharge across the machining gap. Such systems have advantages over a storage-free, direct switching system in that a succession of machining pulses of an extremely short duration in the order of microseconds required for finish EDM operations can readily be provided. In spite of this, however, conventional storage EDM power supply systems have undersirably been limited in use because of inefficiency and lack in versatility.

SUMMARY OF THE INVENTION

Disadvantages and inconvenience of conventional storage-type EDM power supply are overcome in accordance with the present invention by an improved system which comprises: a DC source; a storage capacitor; a charging circuit connecting the DC source to the capacitor; and including first switch means; a discharging circuit connecting the capacitor to a machining gap formed between a tool electrode and a workpiece, and including second switch means; first pulsing means operatively connected to the first switch means for turning it on and off to permit the capacitor to store a predetermined charge from the DC source; and second pulsing means operatively connected to the second switch means for turning it on and off controlledly to discharge the charge stored on the capacitor through the machining gap so that the discharge current traversing the latter has a predetermined waveform.

Specifically, the second pulsing means is adapted, in conjunction with the second switch means constituted as a bank of transistors or other electronic switching elements, to controlledly drive the latter into conduction so that the switch serves in the discharge circuit as a variable resistor which directly determines the current waveform of the capacitor discharge current.

The system may further include a microprocessor comprising memory means for storing therein preprogrammed record signals defining a number of discharge current waveforms to be selectively developed and a central processing unit for processing an input operating signal to select a predetermined one of the preprogrammed record signals corresponding to a desired discharge current waveform and to act on the second pulsing means to set parameters therein thereby rendering the second switch means controlledly conductive so as to develop the desired current waveform across the machining gap.

The second pulsing means is also preferably adapted to provide a train of short-duration signal pulses of a minimum on-time and off-time in a predetermined number or continuously produced for a predetermined duration to the second switch means so that the capacitor discharge current of the controlled waveform is in the form of a composite pulse consisting of elementary machining pulses of the on-time of signal pulses and periodically interrupted with the off-time corresponding to the aforesaid off-time of signal pulses.

SPECIFIC DESCRIPTION

Figure 1A:
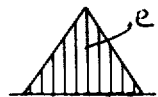
FIGS. 1(a), 1(b), 1(c), 1(d), 1(e) and 1(f) are waveform diagrams schematically illustrating a capacitor discharge current pulse shaped to provide various current-varying characteristics in accordance with the present invention.
Figure 1B:
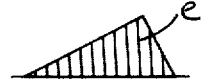
Figure 1C:
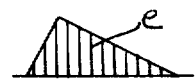
Figure 1D:
Figure 1E:
Figure 1F:
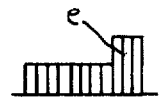

In FIGS. 1(a), (b), (c), (e) and (f) there are shown several typical wave-forms of discharge current passing through the machining gap, which can as desired by provided by the pulsing means acting on the discharge switch to controlledly discharge the charge stored on the capacitor through the machining gap. The waveform (a) is triangular in shape having its peak in the middle of the discharge period; the waveform (b) is triangular in shape having its peak of discharging; the waveform (c) is triangular in shape having its peak at an initial period of discharging; the waveform (d) is stepped in shape having a raised plateau in the middle of the discharge pulse, the waveform (e) is stepped in shape with a raised plateau in an initial period of discharge and the waveform (f) is stepped in shape with a raised plateau in a final period of discharge. Any of these different discharge waveform characteristics is obtained by controlling the switching operation of the discharge switch with pulsing means.

Each waveform may be continuous or integral but should preferably be a composite of elementary pulses as diagrammatically indicated by a character (e).

Figure 2:
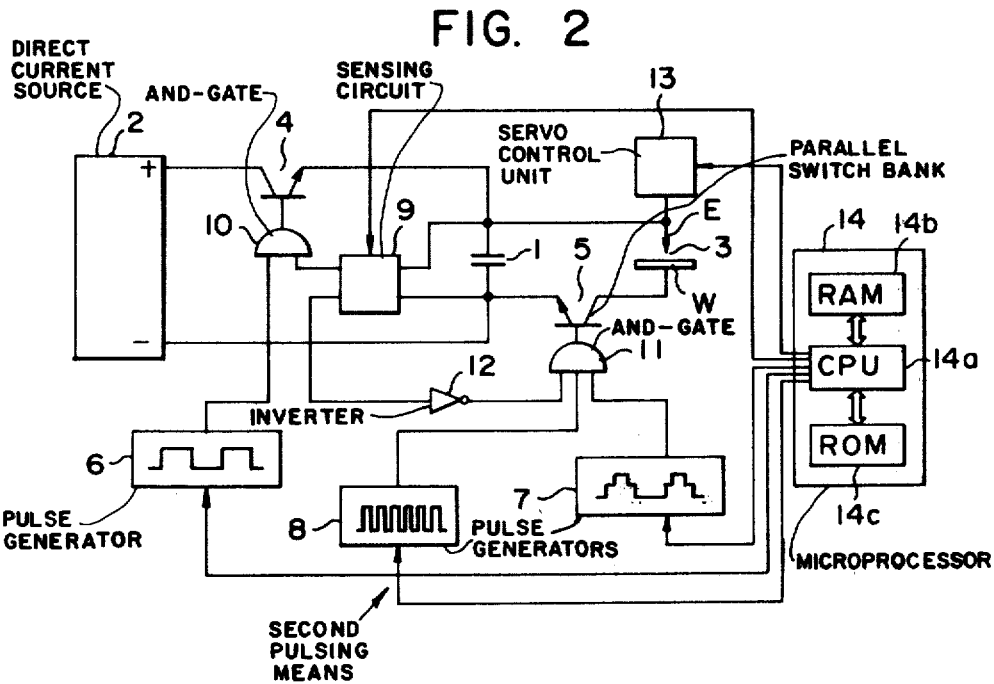
FIG. 2 is a circuit diagram schematically illustrating a power-supply system embodying the present invention.

Referring to FIG. 2 which illustrates an embodiment of the present invention, the storage capacitor 1 is shown to be chargeable by a DC source 2 and dischargeable across a machining gap 3 formed between a tool electrode E and a workpiece W. The charging circuit connecting the DC source 2 with the capacitor 1 includes a switch 4 which is shown by a transistor but typically embodied as a bank of transistors or other electronic switching elements of a predetermined number connected in parallel with one another and capable of carrying a predetermined maximum charging current. Connected in the discharge circuit for the capacitor 1 is a second switch 5 which is again symbolically shown by a single transistor but actually comprises a bank of transistors or other electronic switches of a predetermined number connected in parallel with one another. The latter transistors or switches which also serve here as a variable resistor for the discharge current of the capacitor 1 are, during the time in which each pulse is formed, selectively brought into circuit so that the resulting discharge current through the machining gap 3 has any of the controlled waveforms as desired shown in FIG. 1 or others.

The switch 4 in the charging circuit is turned on and off in response to a pulse provided by a pulse generator 6. The switch 5 in the discharge circuit is turned on and off in response to a pulse provided by a pulse generator 7 and by pulses provided by a pulse generator 8.

The storage capacitor 1 has a sensing circuit 9 connected thereacross for sensing the charging voltage and whose output is combined with the output of the pulse generator 6 at an AND gate 10 which is in turn fed into the controlled electrodes of the switch 4. The sensing circuit 9 has an additional output which is applied via an inverter 12 to a first input of an AND gate 11. The AND gate 11 has a second and third inputs which receives outputs of signal pulse generators 7 and 8, respectively, and an output fed into the control electrodes of the switch 5.

The positioning and displacement of the tool electrode E relative to the workpiece W is effected by a servo-control unit shown at 13. The system is also provided with a microprocessor 14 containing a central processing unit (CPU) 14a, a random-access memory (RAM) 14b and a read-only memory (ROM) 14c. Memories 14b and 14c are provided to store numerical data concerning various machining conditions to be set at signal generators 6, 7 (waveform) and 8, the sensing circuit 9 and the servo-control unit 13. The central processing unit 14a is responsive to manual input signals, a signal indicating changes in the machining state in the gap 3 or a signal commanding a desired change in successive machining steps to process the stored numerical data and then to provide output signals which acts on the elements 6, 7, 8, 9 and 13.

In operation, the capacitor 1 commences charging when the switch 4 is turned on and continues to be charged until it is turned off. The charging energy for the capacitor 1 is determined by the on-time of the switch 4 which is set at the signal pulse generator 6. The dischargeable storage energy of a level which would best suit to a preselected machining mode and conditions is thus assured by adjusting the on-time for the switch 4. When the capacitor 1 completes charging to a desired level, the switch 5 in the discharge circuit is turned on to provide an electrical discharge of an on-time or duration Ton determined at the signal pulse generator 7 through the machining gap 3. During the single pulse discharge, the number of transistors constituting the switch 5 in circuit between the capacitor 1 and the machining gap 3 is altered in response to the signal provided by the pulse generator 7 to change continuously or stepwise the effective resistance in the discharge circuit so that the pulsed electrical discharge of a desired waveform passes through the machining gap 3. In the preferred embodiment illustrated, the additional signal pulse generator 8 furnishes the AND gate 11 with a succession of elementary signal pulses of a minimum duration or on-time $\tau$on and a minimum pulse interval or off-time $\tau$off. The succession of elementary signal pulses combined at the AND gate 11 with a signal pulse of the longer on-time Ton incoming from the generator 7 and hence capable of continuing for the duration Ton are applied to the switch 5. During the time Ton, the switch 5 is periodically driven and rendered conductive with the duration $\tau$on and nonconductive with the interval $\tau$off. The result is the passage of a composite discharge pulse (Ton) of a controlled waveform and consisting of periodically occurring or interrupted elementary discharge pulses ($\tau$on, $\tau$off) across the machining gap 3 as diagrammatically shown in FIG. 1.

As the charge on the capacitor 1 is being dissipated as a result of the controlled formation of an integral or composite electrical discharge through the machining gap 3, its terminal voltage drops and is sensed by the sensing circuit 9 having a threshold value set therein. The sensing circuit thus has threshold functions and can be constituted, for example, by a Schmitt-trigger circuit. When the terminal voltage of the capacitor 1 becomes less than this value, the sensing circuit 9 operates to provide a "1" output signal. The output signal is applied to the gate 10 to enable it to allow a signal pulse of the generator 6 to pass therethrough and to be applied to the charging switch 4. With the switch 4 rendered conductive, the capacitor 1 commences recharging.

The output signal "1" of the sensing circuit 9 on the other hand is inverted by the NOT gate 12 to an "0" signal which is applied to the AND gate 11 to disable it to keep the switch 5 nonconductive. The sensing circuit 9 has also a second threshold value preset therein. When the charging level or terminal voltage of the capacitor 1 exceeds this value, an inversion takes place in the state of the sensing circuit 9 to provide an "0" output signal which is on one hand applied to the AND gate 10 and on the other hand, upon inversion to a "1" signal by the NOT tage 12, to the AND gate 11. Now, the gate 10 is disabled to inhibit a signal pulse of the generator 6 from being passed to the switch 4 thereby rendering it nonconductive and the gate 11 is enabled to allow a signal pulse of the generator 7 to be passed to the switch 5 thereby rendering it conductive. In this manner, the charging and discharging cycles of the capacitor 1 are precisely controlled by the charging and discharging switches 4 and 5 brought into and held in conjugate stages at all times so that a precisely controlled repetition of the storage of a predetermined amount of electrical energy and the subsequent discharge thereof with a desired current waveform is assured. In successive discharge cycles, the switch 5 is controlledly rendered conductive by means of the controlled output signal of the generator 7 to develop an integral or periodically interrupted composite machining pulse of a discharge waveformed preselected to suit a particular machining mode desired.

In the preferred embodiment shown, an additional signal pulse generator 8 is provided to furnish a series of short-duration signal pulses to be applied to the discharge switch 5 for the duration of a signal pulse furnished by a principal discharge signal pulse generator 7 so that the gap discharge current of the controlled waveform is in the form of a composite pulse consisting of periodically interrupted elementary pulses.

A succession of elementary pulses constituting a composite discharge current may have an on-time or duration $\tau$on and an off-time or pulse interval $\tau$off each in the range between 1 and 100 microseconds which are preset at the signal pulse generator 8. In the repetition of charging and discharging of the capacitor 1 in the system illustrated, there is thus produced at the machining gap 3 a succession of periodically occurring trains of elementary machining pulses with each train containing a preset number of the periodically interrupted elementary pulses.

A desired machining operation is thus permitted to be achieved with an improved stability and efficiency in accordance with the preset invention in which a storage capacitor 1 is controlledly charged and subsequently discharged in a unique manner to develop successive machining discharge pulses each of a predetermined shape. It has been found that the increased efficiency amounts to twice that attainable with conventional storage capacitor systems. The present system also allows for the selection of machining pulses over an extended range from an extremely narrow pulses to those of a maximum practical duration with a single equipment. Further, constituting each capacitor discharge as a succession of short-duration elementary pulses has been found to offer particular advantages as regards the surface finish and machining stability attainable. The whole range of EDM operations extending from roughing to extra-fine finishing is thereby covered.

An important feature of the present invention also lies in the use of a microprocessor 14 comprising memories 14b, 14c in which preprogrammed record signals are stored corresponding to a number of waveforms of the gap capacitor discharge current to be selectively developed. The central processing unit 14a is operative in response to manual operating signals and/or a machining status signal automatically derived from the machining gap to process the input data, thereby extracting a predetermined waveform signal which is applied to the signal pulse generator 7 to adjust the settings therein accordingly. The signal generator 7 is then allowed to furnish the corresponding signal pulses to the switch 5. The latter is thus rendered controlledly conductive to permit the stored charge on the capacitor to be discharged through the gap 1 with the current waveform commanded by the microprocessor 14.

What is claimed is:

1. A power-supply system for electrical discharge machining comprising:
    a direct-current source connected in series with first and second switch means to a machining gap formed between a tool electrode and a workpiece;
    a storage capacitor connected to said direct current source in parallel with said machining gap;
    a charging circuit connecting said direct-current source to said capacitor and including said first switch means;
    a discharging circuit connecting said capacitor to said machining gap and including said second switch means directly in series with said gap;
    first pulsing means for controlledly turning on and off said first switch means to permit said capacitor to store a predetermined charge from said DC source; and
    second pulsing means for controlledly turning on and off said second switch means to permit said predetermined charge stored on said capacitor to be discharged directly through said machining gap to provide a discharge current therein of a predetermined waveform preset in said second pulsing means.

2. The system defined in claim 1 wherein said second switch means comprises a bank of electronic switches connected in parallel with one another between said capacitor and said machining gap in said discharging circuit and rendered selectively conductive by said second pulsing means to form a variable resistance in said discharging circuit to develop said predetermined waveform of said discharge current.

3. The system defined in claim 1, further comprising a microprocessor having memory means for storing record signals corresponding to different discharge-current waveforms to be selectively developed and a central processing unit operative in response to an operating input signal to process said stored signals to extract a predetermined one of said waveform signals and to apply an output switching signal corresponding thereto to said second pulsing means.

4. The system defined in claim 1 wherein said second pulsing means is adapted to provide a succession of time-spaced trains of elementary signal pulses of a minimum on-time and off-time to thereby control the conduction of said second switch means so that each discharge current of the predetermined waveform is produced in the form of a composite pulse consisting of elementary machining pulses of a duration corresponding to said on-time and interrupted periodically with a pulse interval corresponding to said off-time.

5. The system defined in claim 1, further comprising a sensing circuit connected across said capacitor and having first and second different threshold values preset therein controlling the switching operation of said first and second switch means, respectively.

* * * * *